United States Patent [19]

Cook

[11] Patent Number: 5,781,343
[45] Date of Patent: Jul. 14, 1998

[54] ADJUSTABLE WINDOW TINTING SYSTEM

[76] Inventor: Jeffrey D. Cook, 114 Jib Dr., Stafford, Va. 22554

[21] Appl. No.: 699,502

[22] Filed: Aug. 19, 1996

[51] Int. Cl.$^6$ .............................. G02B 5/08; G02B 5/24; G02B 26/02
[52] U.S. Cl. .............. 359/608; 359/601; 359/228; 359/886
[58] Field of Search ................... 359/601–609, 359/614, 227–228, 665–666, 885–886; 351/158–159; 296/211–223, 96.19

[56] References Cited

U.S. PATENT DOCUMENTS

| | | | |
|---|---|---|---|
| 1,782,328 | 11/1930 | Wearham | 359/886 |
| 2,474,712 | 6/1949 | Aparicio | 359/886 |
| 3,174,398 | 3/1965 | Brauner | 359/886 |
| 3,914,027 | 10/1975 | Caron | 359/886 |
| 4,309,080 | 1/1982 | Hanchard et al. | 359/886 |
| 4,390,240 | 6/1983 | Bookbinder | 359/228 |
| 5,224,771 | 7/1993 | Oishi | 359/886 |
| 5,390,045 | 2/1995 | Bernard, Jr. | 359/601 |

FOREIGN PATENT DOCUMENTS

| 08206 | 7/1933 | Australia | 359/886 |
|---|---|---|---|

*Primary Examiner*—Thong Nguyen

[57] ABSTRACT

An adjustable window tinting system for producing varying degrees of tint in a window to thereby limit the amount of light and heat pass through a window. The device includes two panes of glass, a darkening mechanism which separates and merges the two panes of glass, and an opaque fluid that enters between the two panes of glass at various thickness depending upon the amount of separation of the two panes of glass. The various degrees of tint are thus attained from the various thickness of the opaque fluid, varying from substantially opaque to transparent.

12 Claims, 3 Drawing Sheets

ADJUSTABLE WINDOW TINTING SYSTEM

BACKGROUND OF THE INVENTION

1. Field of the Invention

The present invention relates to Shading Devices and more particularly pertains to a new Adjustable Window Tinting System for tinting a window to various degrees of tint thereby limiting the amount of light and heat that pass through a window.

2. Description of the Prior Art

The use of Shading Devices is known in the prior art. More specifically, Shading Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Shading Devices include U.S. Pat. No. 4,641,922; U.S. Pat. No. 5,390,045; U.S. Pat. No. 5,009,044; U.S. Pat. No. 4,696,547; U.S. Pat. No. 4,456,335 and U.S. Pat. No. 5,406,414.

While these devices fulfill their respective, particular objectives and requirements, the aforementioned patents do not disclose a new Adjustable Window Tinting System. The inventive device includes two panes of glass, a darkening means which separates and merges the two panes of glass, and an opaque fluid that enters mesial the two panes of glass at various thickness depending upon the amount of separation of the two panes of glass.

In these respects, the Adjustable Window Tinting System according to the present invention substantially departs from the conventional concepts and designs of the prior art, and in so doing provides an apparatus primarily developed for the purpose of tinting a window to various degrees of tint thereby limiting the amount of light and heat that pass through a window.

SUMMARY OF THE INVENTION

In view of the foregoing disadvantages inherent in the known types of Shading Devices now present in the prior art, the present invention provides a new Adjustable Window Tinting System construction wherein the same can be utilized for tinting a window to various degrees of tint thereby limiting the amount of light and heat that pass through a window.

The general purpose of the present invention, which will be described subsequently in greater detail, is to provide a new Adjustable Window Tinting System apparatus and method which has many of the advantages of the Shading Devices mentioned heretofore and many novel features that result in a new Adjustable Window Tinting System which is not anticipated, rendered obvious, suggested, or even implied by any of the prior art Shading Devices, either alone or in any combination thereof.

To attain this, the present invention generally comprises two panes of glass, a darkening means which separates and merges the two panes of glass, and an opaque fluid that enters mesial the two panes of glass at various thickness depending upon the amount of separation of the two panes of glass.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Still yet another object of the present invention is to provide a new Adjustable Window Tinting System which provides in the apparatuses and methods of the prior art some of the advantages thereof, while simultaneously overcoming some of the disadvantages normally associated therewith.

Still another object of the present invention is to provide a new Adjustable Window Tinting System for tinting a window to various degrees of tint thereby limiting the amount of light and heat that pass through a window.

Yet another object of the present invention is to provide a new Adjustable Window Tinting System which includes two panes of glass, a darkening means which separates and merges the two panes of glass, and an opaque fluid that enters mesial the two panes of glass at various thickness depending upon the amount of separation of the two panes of glass.

Still yet another object of the present invention is to provide a new Adjustable Window Tinting System that protects and provides privacy to the interior of a vehicle, house, or any structure with windows.

Even still another object of the present invention is to provide a new Adjustable Window Tinting System that increases the comfort within a structure by reducing the amount of visible light and radiative heat that enters the structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
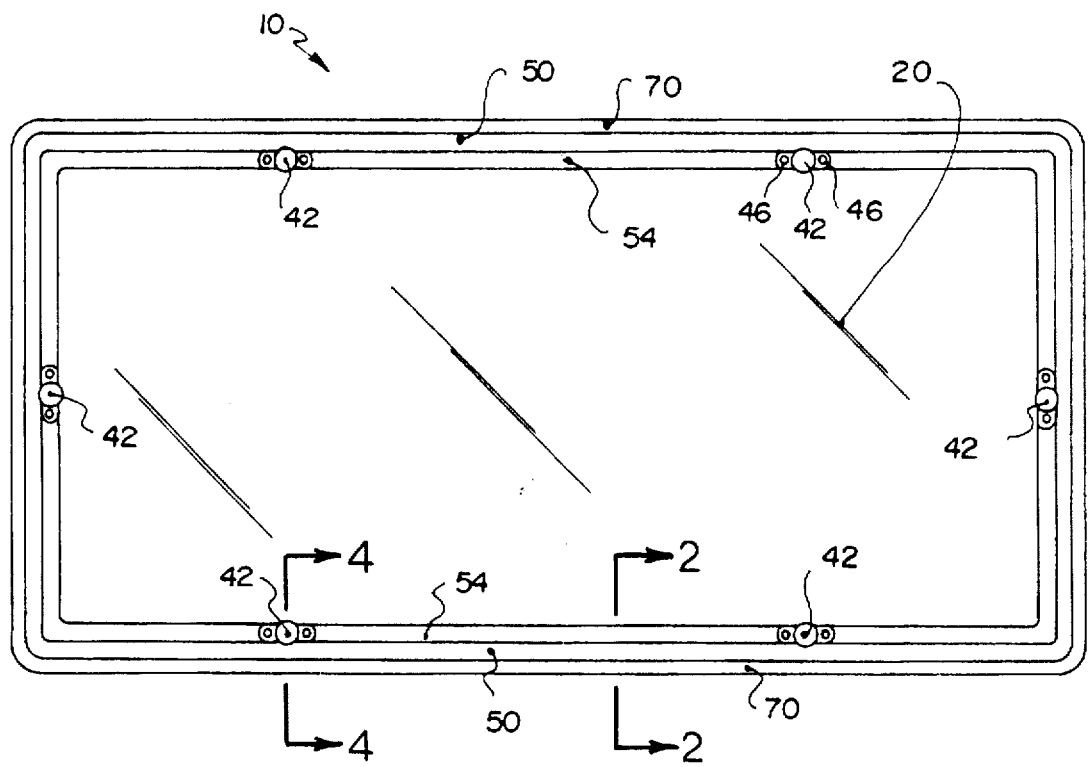
FIG. 1 is a top view of a new Adjustable Window Tinting System according to the present invention.

With reference now to the drawings, and in particular to FIGS. 1 through 6 thereof, a new Adjustable Window Tinting System embodying the principles and concepts of the present invention and generally designated by the reference numeral 10 will be described.

More specifically, it will be noted that the Adjustable Window Tinting System 10 comprises an exterior glass pane 20, an interior glass pane 30 positioned parallel to the exterior glass pane 20, a sealing boot 50 secured to both the exterior glass pane 20 and the interior glass pane 30 to form an enclosed space mesial the exterior glass pane 20 and the interior glass pane 30 when separated, and where the sealing boot 50 contains a reservoir, and an opaque fluid 60 residing within the enclosed space and within the reservoir, thereby limiting the amount of light projecting through.

Figure 2:
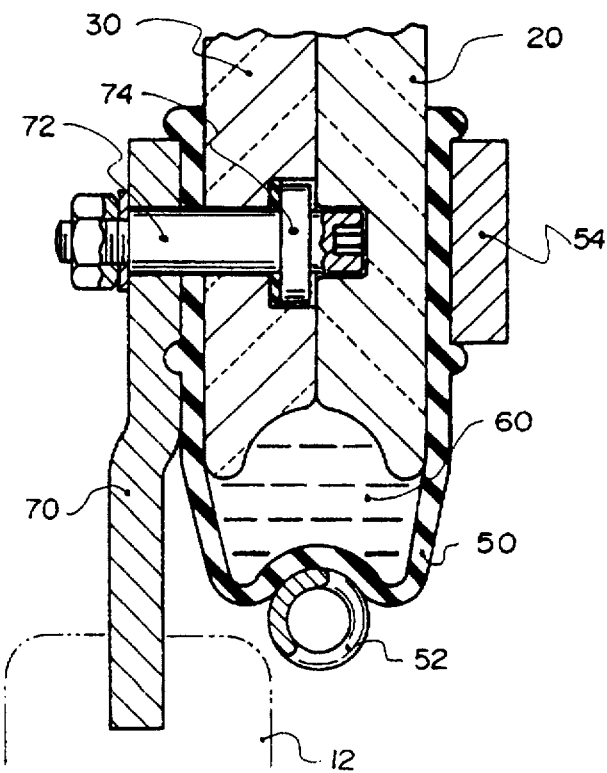
FIG. 2 is a cross sectional view taken along line 2—2 of FIG. 1 disclosing the guide pin with the exterior and the interior glass juxtaposed.
Figure 3:
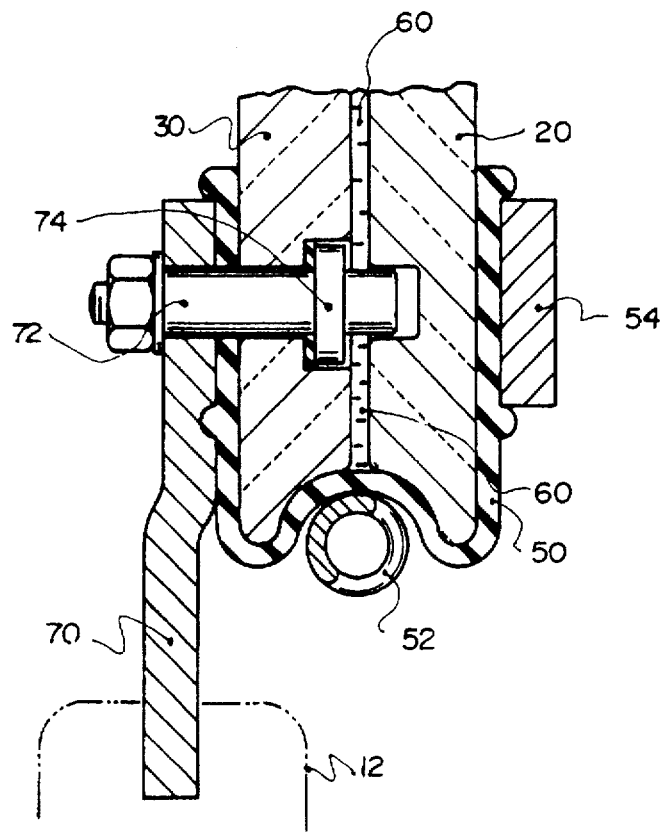
FIG. 3 is a view from FIG. 2 with the exterior and the interior glass separated allowing the opaque fluid to enter.
Figure 4:
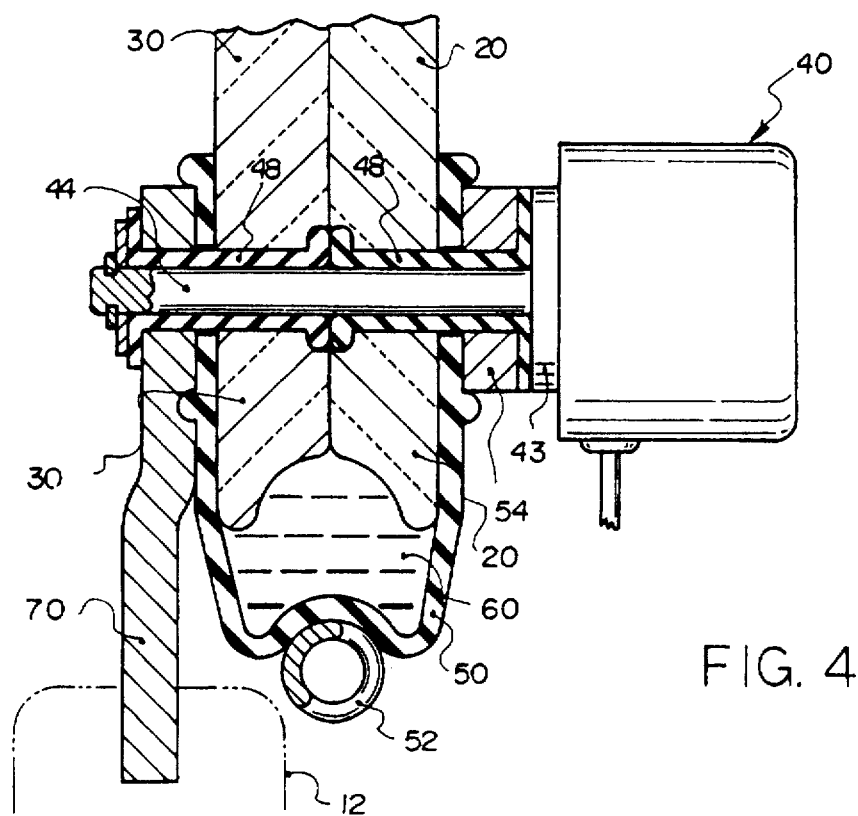
FIG. 4 is a cross sectional view taken along line 4—4 of FIG. 1 disclosing the solenoid with the exterior and the interior glass juxtaposed.
Figure 5:
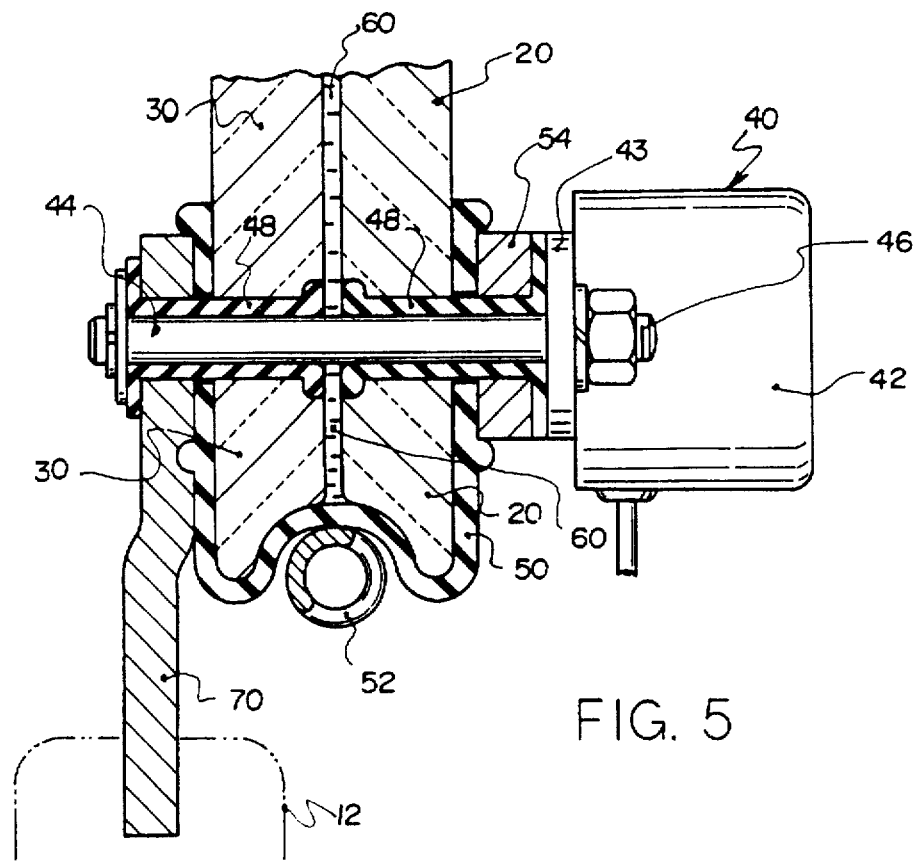
FIG. 5 is a view from FIG. 4 with the exterior and the interior glass separated allowing the opaque fluid to enter.
Figure 6:
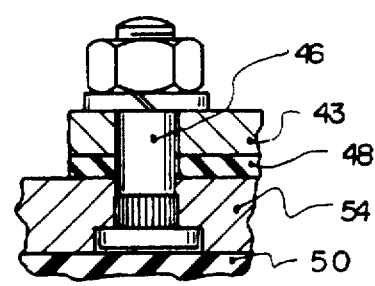
FIG. 6 is a cut away view of the mounting stud secured to the outer rim.

As best illustrated in FIGS. 4 and 5, it can be shown that a darkening means 40 manipulates the separation distance mesial the exterior glass pane 20 and the interior glass pane 30, thereby adjusting the thickness of the opaque fluid 60 mesial to adjust the light limiting characteristics. As shown in FIGS. 2 through 5 of the drawings, a spring 52 surrounds the sealing boot 50. The spring forces the opaque fluid 60 stored within the reservoir towards the enclosed space. The darkening means 40 has a plurality of solenoids 42 secured around the peripheral of the exterior glass pane 20 as best disclosed in FIG. 1 of the drawings. As shown in FIGS. 4 and 5, a rod 44 projects from the solenoid 42 slidably through the exterior glass pane 20 and is secured to the interior glass pane 30. The solenoid 42 separates the exterior glass pane 20 and the interior glass pane 30 upon the application of an electrical current to the solenoid 42. A rod seal 48 encases the rod 44, which prevents leakage of the opaque fluid 60 around the rod 44. A plurality of guide pins 72 are secured to the periphery of the interior glass pane 30 and slidably project into the exterior glass pane 20 as best shown in FIGS. 2 and 3 of the drawings. A stationary plate 70 is secured to the outer surface of the interior glass pane 30 as shown in FIGS. 2 through 5 of the drawings. The rod 44 preferably projects through the interior glass pane 30 and engages the stationary plate 70. The stationary plate 70 is preferably mounted to a mounting surface 12 to support the pair of glass panes 20, 30. The opaque fluid 60 is capable of limiting a substantial amount of visible light and radiating heat when the exterior glass pane 20 is separated from the interior glass pane 30 a finite distance as shown in FIGS. 3 and 5 of the drawings. As shown in FIGS. 2 and 3, the guide pin 72 has a flange 74 at the end engaging the interior glass pane 30. An outer rim 54 is mesial the sealing boot 50 and a mounting plate 43 of the solenoid 42 to provide an even distribution of the forces produced by the solenoid 42 to the exterior glass pane 20. The solenoid 42 may be operated manually by a switch or automatically by the ignition of a vehicle for example.

In use, the solenoid 42 is activated, thereby pushing the rod 44 secured to the interior glass pane 30. The solenoid 42, secured to the exterior glass pane 20, is thereby pushed away from the interior glass pane 30 which is mounted to a mounting surface 12 that supports the present invention. The solenoid's 42 movement away from the interior glass pane 20 thereby separates the exterior glass pane 20 from the interior glass pane 30 creating the enclosed space. The opaque fluid 60 stored within the sealing boot 50 is projected into the enclosed space by the contracting forces produced by the spring 52 surrounding the peripheral of the sealing boot 50. The opaque fluid 60 enters the enclosed space and has a thickness determined only by the separation distance of the exterior glass pane 20 and the interior glass pane 30. This separation distance is adjustable to achieve the desired amount of tinting, whether the user desires nontransparent, semi-transparent, or transparent. The above process then can be reversed by manipulating the solenoid 42 to merge the exterior glass pane 20 juxtaposed to the interior glass pane 30 to force the opaque fluid 60 out from within the enclosed space into the reservoir of the sealing boot 50 to create a transparent window to see through without any tinting effect.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable window tinting system comprising:
   a substantially rigid exterior glass pane having an outer perimeter edge;
   substantially rigid interior glass pane having an outer perimeter edge and being positioned substantially parallel to the exterior glass pane;
   moving means for moving said glass panes between a separated condition wherein said panes have a space therebetween and an adjacent condition wherein said panes are substantially in contact with each other;
   a sealing boot secured to and joining the outer perimeter edges of the exterior glass pane and the interior glass pane, said sealing boot forming a reservoir about the perimeter of the glass panes in fluid communication with a space between said glass panes; and
   an opaque fluid movable between the reservoir in said sealing boot and a space between said glass panes;
   wherein movement of said glass panes toward said separated condition by said moving means creates a space therebetween to pull said opaque fluid from said reservoir into the space between said glass panes to thereby resist passage of light between said glass panes, and wherein movement of said glass panes toward said adjacent condition by said moving means collapses the space between said glass panes to force said opaque fluid into the reservoir in said sealing boot to thereby permit passage of light between said glass panes;
   wherein the moving means includes:
   a plurality of solenoids mounted to one of said glass panes;

each said solenoid having a solenoid rod projecting therefrom and being selectively movable between inward and outward positions relative to said solenoid, said solenoid rod being slidably movable through said glass pane on which said solenoid is mounted, and said solenoid rod having a distal end opposite said solenoid, said distal end being secured to the the other said glass pane to move said glass panes toward said separated condition when said solenoid rod is moved toward said outward position and to move said glass panes toward said adjacent condition when said solenoid is moved toward said inward position.

2. The adjustable window tinting system of claim 1 wherein a spring extends along the sealing boot adjacent to the outer perimeter edges of the interior and exterior panes to produce a substantially uniform inward contraction of said sealing boot when said moving means moves said interior and exterior glass panes into a separated condition.

3. The adjustable window tinting system of claim 1 additionally comprising a rod seal encircling the solenoid rod and positioned between said solenoid rod and said glass panes to resist passage of the opaque fluid between said glass panes and said solenoid rod.

4. The adjustable window tinting system of claim 1 wherein the opaque fluid is characterized by being capable of limiting the amount of visible light and heat traveling between said glass panes when said glass panes are moved into a separated condition.

5. The adjustable window tinting system of claim 1 additionally comprising a stationary plate is secured to the outer surface of one said glass pane.

6. An adjustable window tinting system comprising a substantially rigid exterior glass pane having an outer perimeter edge;

substantially rigid interior glass pane having an outer perimeter edge and being positioned substantially parallel to the exterior glass pane;

moving means for moving said glass panes between a separated condition wherein said panes have a space therebetween and an adjacent condition wherein said panes are substantially in contact with each other;

a sealing boot secured to and joining the outer perimeter edges of the exterior glass pane and the interior glass pane, said sealing boot forming a reservoir about the perimeter of the glass panes in fluid communication with a space between said glass panes;

an opaque fluid movable between the reservoir in said sealing boot and a space between said glass panes; and a plurality of guide pins secured to the peripheral regions of one said glass pane and slidably projecting through the other said glass pane;

wherein movement of said glass panes toward said separated condition by said moving means creates a space therebetween to pull said opaque fluid from said reservoir into the space between said glass panes to thereby resist passage of light between said glass panes, and wherein movement of said glass panes toward said adjacent condition by said moving means collapses the space between said glass panes to force said opaque fluid into the reservoir in said sealing boot to thereby permit passage of light between said glass panes.

7. The adjustable window tinting system of claim 6 additionally comprising a stationary plate is secured to the outer surface of one said glass pane.

8. The adjustable window tinting system of claim 6 wherein a spring extends along the sealing boot adjacent to the outer perimeter edges of the interior and exterior panes to produce a substantially uniform inward contraction of said sealing boot when said moving means moves said interior and exterior glass panes into a separated condition.

9. The adjustable window tinting system of claim 6 wherein the opaque fluid is characterized by being capable of limiting the amount of visible light and heat traveling between said glass panes when said glass panes are moved into a separated condition.

10. An adjustable window tinting system comprising a substantially rigid exterior glass pane having an outer perimeter edge;

substantially rigid interior glass pane having an outer perimeter edge and being positioned substantially parallel to the exterior glass pane;

moving means for moving said glass panes between a separated condition wherein said panes have a space therebetween and an adjacent condition wherein said panes are substantially in contact with each other;

a sealing boot secured to and joining the outer perimeter edges of the exterior glass pane and the interior glass pane, said sealing boot forming a reservoir about the perimeter of the glass panes in fluid communication with a space between said glass panes;

an opaque fluid movable between the reservoir in said sealing boot and a space between said glass panes;

a stationary plate is secured to the outer surface of one said glass pane; and a guide pin projecting through the one said glass pane and being mounted to the stationary plate, said stationary plate being for mounting to a mounting surface to support said glass panes;

wherein movement of said glass panes toward said separated condition by said moving means creates a space therebetween to pull said opaque fluid from said reservoir into the space between said glass panes to thereby resist passage of light between said glass panes, and wherein movement of said glass panes toward said adjacent condition by said moving means collapses the space between said glass panes to force said opaque fluid into the reservoir in said sealing boot to thereby permit passage of light between said glass panes.

11. The adjustable window tinting system of claim 10 wherein the opaque fluid is characterized by being capable of limiting the amount of visible light and heat traveling between said glass panes when said glass panes are moved into a separated condition.

12. The adjustable window tinting system of claim 10 wherein a spring extends along the sealing boot adjacent to the outer perimeter edges of the interior and exterior panes to produce a substantially uniform inward contraction of said sealing boot when said moving means moves said interior and exterior glass panes into a separated condition.

* * * * *